United States Patent
Takei et al.

(10) Patent No.: US 6,805,822 B2
(45) Date of Patent: Oct. 19, 2004

(54) METHOD FOR PRODUCING THERMOPLASTIC ELASTOMER POWDER

(75) Inventors: Tsuyoshi Takei, Ichihara (JP); Hikaru Shimizu, Ichihara (JP)

(73) Assignee: Sumitomo Chemical Company, Limited, Osaka (JP)

(*) Notice: Subject to any disclaimer, the term of this patent is extended or adjusted under 35 U.S.C. 154(b) by 449 days.

(21) Appl. No.: 09/951,482

(22) Filed: Sep. 14, 2001

(65) Prior Publication Data

US 2002/0053752 A1 May 9, 2002

(30) Foreign Application Priority Data

Sep. 20, 2000 (JP) .......................... 2000-284975
Sep. 21, 2000 (JP) .......................... 2000-286898

(51) Int. Cl.$^7$ .............................. B29C 47/78
(52) U.S. Cl. ............................ 264/142; 264/143
(58) Field of Search .................... 264/140, 142, 264/143, 331.11

(56) References Cited

U.S. PATENT DOCUMENTS

| 3,963,679 A | * | 6/1976 | Ullrich et al. ................ 528/45 |
| 5,085,815 A | * | 2/1992 | Yeh et al. .................... 264/142 |
| 5,265,507 A | * | 11/1993 | Noda et al. ..................... 83/22 |
| 5,292,240 A | * | 3/1994 | Capelle ...................... 425/142 |
| 5,525,274 A | | 6/1996 | Grimmer |
| 5,525,284 A | | 6/1996 | Grimmer |
| 5,840,229 A | | 11/1998 | Sugimoto et al. |
| 5,911,928 A | | 6/1999 | Shimazu et al. |
| 5,998,030 A | | 12/1999 | Grimmer |
| 6,335,095 B1 | * | 1/2002 | Sugimoto et al. ........... 428/402 |
| 6,426,026 B1 | * | 7/2002 | Avgousti et al. ............ 264/143 |
| 6,485,664 B1 | * | 11/2002 | Wreschinsky .......... 264/211.21 |
| 6,669,986 B1 | * | 12/2003 | Mushiake et al. .......... 427/214 |

FOREIGN PATENT DOCUMENTS

| EP | 0 887 378 A1 | 12/1998 |
| JP | 61-195808 A | 8/1986 |
| JP | 01-234212 A | 9/1989 |
| JP | 10-81793 A | 3/1998 |
| WO | WO 97/43337 A1 | 11/1997 |

OTHER PUBLICATIONS

U.S. patent application Ser. No. 08/933,044, allowed Aug. 9, 2001.

* cited by examiner

*Primary Examiner*—Mark Eashoo
(74) *Attorney, Agent, or Firm*—Sughrue Mion, PLLC

(57) ABSTRACT

A method for producing powder of a thermoplastic elastomer having a sphere-reduced average particle diameter of 700 μm or less by an under water cut method which comprises discharging the thermoplastic elastomer in melt state through a plurality of orifice in a dice in into water, and cutting the discharged matter with a cutter blade rotating along the die surface to obtain powder of the thermoplastic elastomer, wherein the method satisfies the following conditions (a) and (b):

(a) the temperature of the thermoplastic elastomer directly before the die is from 120 to 220° C., and
(b) the temperature of a die is from 230 to 350° C.

7 Claims, No Drawings

METHOD FOR PRODUCING THERMOPLASTIC ELASTOMER POWDER

BACKGROUND OF THE INVENTION

1. Field of the Invention

The present invention relates to a method for producing a thermoplastic elastomer powder. More particularly, the present invention relates to a method for efficiently producing a thermoplastic elastomer powder having a sphere-reduced average particle diameter of 700 µm or less, by an under water cut method.

2. Description of Related Art

Conventionally, sheet-like molded articles having complicated uneven patterns on the surface, such as leather grains, stitches or the like, are used as skin materials such as automobile interior parts and the like. As such, a molded article formed by powder-molding a polyvinyl chloride-based composition is used. However, the molded article has problems such as generating hydrogen chloride gas and the like in incineration of the molded article. Therefore, a substitute for the molded article is required. A proposed substitute are thermoplastic elastomer powders obtained by grinding, for example, a thermoplastic elastomer composition of an ethylene-α-olefin-based copolymer rubber with a polyolefin-based resin by means of a mechanical grinding method such as a freeze grinding or the like (e.g. JP05001183A, JP05005050A).

However, such a thermoplastic elastomer powder is inferior in a falling property due to its irregular form in individual particle of the powder. When a molded article having a complicated form is produced, for example a molded article having a convex portion which is narrow and high, the molded article experiences failures at the edge of the convex portion, such as pinholes, underfill, and the like. Two steps are required for producing the thermoplastic elastomer powder: a thermoplastic elastomer composition is once molded into pellet, and the pellet is mechanically ground.

For solving such problems, there are known thermoplastic elastomer powders produced by methods such as under water cut methods and the like (e.g. JP10081793A) that have a specific melt property and powder property.

The under water cut method comprises discharging a thermoplastic elastomer in melt state through a plurality of orifices of a die into water, and cutting the discharged matter with a cutter blade rotating along the die surface to obtain powder of the thermoplastic elastomer.

Further, the powder is usually transported together with water, collected and dried with a centrifugal drier or the like.

When a molded article is produced by a powder molding method, such as a powder slush molding method or the like, using a thermoplastic elastomer powder having a specific melting property and powder property, it is necessary to suppress the sphere-reduced average particle diameter of the thermoplastic elastomer powder to 700 µm or less, to control the thickness of a molded article to about 1.4 mm or less.

However, when a thermoplastic elastomer powder having a sphere-reduced average particle diameter of 700 µm or less is used in the under water cut method, the die surface is exposed constantly to water and cooled, and the thermoplastic elastomer composition in melt state is solidified in the orifice causing clogging, and leading to a reduction in productivity.

Specifically, the particle diameter ($R_\alpha$) of a powder obtained by the under water cut method shows a relation of the following equation (1). When a powder having fine particle size is going to be produced, even if the average discharge amount (M) per orifice is reduced and the cutting speed (P) increases as production conditions, clogging rate (α) increases leading to a problem of reduction in productivity.

$$R_\alpha = \{M/(\pi \times D \times P)/(1-\alpha) \times 10^{14}\}^{1/3} \qquad (1)$$

M: average discharge amount per orifice (g/hour·orifice)

D: density of thermoplastic elastomer composition (Kg/m³)

P: cutting speed (the number of times/min.)

α×100: clogging rate (%)

$R_\alpha$: particle size when clogging rate is α (µm)

Herein, the average discharge amount per orifice is obtained by simply dividing the whole die discharge amount by the number of die orifices. The cutting speed is the number of cuttings of the thermoplastic elastomer extruded through die orifices per minute, and is a value obtained by multiplying the rotation number of a cutter by the number of blades attached to a cutter rotation part.

SUMMARY OF THE INVENTION

An object of the present invention is to provide a method for producing a thermoplastic elastomer powder having a sphere-reduced average particle diameter of 700 µm or less by an under water cut method without lowering productivity.

Namely, the present invention relates to a method for producing powder of a thermoplastic elastomer having a sphere-reduced average particle diameter of 700 µm or less by an under water cut method which comprises discharging the thermoplastic elastomer in melt state through a plurality of orifices of a die into water, and cutting the discharged matter with a cutter blade rotating along the die surface to obtain powder of the thermoplastic elastomer, wherein the method satisfies the following conditions (a) and (b):

(a): the temperature of the thermoplastic elastomer directly before the die is from 120 to 220° C., and (b): the temperature of the die is from 230 to 350° C.

DETAILED DESCRIPTION OF THE INVENTION

As the thermoplastic elastomer, there are listed, for example, a polyolefin-based thermoplastic elastomer, styrene-based thermoplastic elastomer, polyurethane-based thermoplastic elastomer, polyvinyl chloride-based thermoplastic elastomer and the like.

A polyolefin-based thermoplastic elastomer, styrene-based thermoplastic elastomer, a mixture thereof, and a mixture of the styrene-based thermoplastic elastomer and a polyolefin-based resin described below are preferable.

The polyolefin-based thermoplastic elastomer is usually composed of a rubber (i) selected from an olefin-based copolymer rubber, a conjugated diene-based polymer rubber and a hydrogenated product of the conjugated diene-based polymer rubber, and a polyolefin-based resin (ii).

Examples of the olefin-based copolymer rubber include, for example, a copolymer rubber of ethylene with an α-olefin having 3 or more carbon atoms, a copolymer rubber of propylene with an α-olefin having 4 or more carbon atoms, and the like.

Examples of the α-olefin in the copolymer rubber of ethylene with an α-olefin having 3 or more carbon atoms (ethylene-α-olefin copolymer rubber), preferably include α-olefin having 3 to 10 carbon atoms such as propylene, 1-butene, 3-methyl-1-butene, 1-hexene, 1-octene and the like. These α-olefins may be used alone or in combination of two or more, and for example, propylene and an α-olefin having 4 or more carbon atoms may be used in combination.

The content of an ethylene unit derived from ethylene in the ethylene-α-olefin copolymer rubber is usually from 5 to 95% by weight, preferably from 15 to 85% by weight, and the content of an α-olefin unit derived from the α-olefin is usually from 5 to 95% by weight, preferably from 15 to 85%. The total amount of the ethylene unit and the α-olefin unit is 100% by weight. The ethylene unit content and α-olefin unit content can be measured by methods such as a $^{13}$C-NMR method, infrared absorption spectral method and the like.

The ethylene-α-olefin copolymer rubber may contain other monomer units. Examples of other monomers include non-conjugated dienes having 5 to 15 carbon atoms such as dicyclopentadiene, 5-ethylidene-2-norbornene, 1,4-hexadiene, 1,5-dicyclooctadiene, 7-methyl-1,6-octadiene, 5-vinyl-2-norbornene, divinylbenzene and the like; vinyl ester compounds such as vinyl acetate and the like; ethylenically unsaturated carboxylic acid ester compounds such as methyl methacrylate, ethyl methacrylate, methyl acrylate, ethyl acrylate, butyl acrylate and the like; vinylnitrile compounds such as acrylonitrile, methacrylonitrile and the like. These other monomer units are used alone or in combination of two or more. The amount of the other monomer unit in the copolymer rubber may be determined within a range of up to 20% by weight considering the kind of the monomer.

Examples of the ethylene-α-olefin copolymer rubber include ethylene-propylene copolymer rubber, ethylene-1-butene copolymer rubber, ethylene-1-hexene copolymer rubber, ethylene-1-octene copolymer rubber, ethylene-propylene-5-ethylidene-2-norbornene copolymer rubber (EPDM), propylene-1-butene-ethylene copolymer rubber, propylene-1-hexene-ethylene copolymer rubber, propylene-1-octene-ethylene copolymer rubber, and the like.

The ethylene-α-olefin copolymer rubber preferably has an intrinsic viscosity [η] measured in xylene at 70° C. of 0.3 dl/g or more since sticky feeling does not occur in the resulted molded article. The ethylene-α-olefin copolymer rubbers may be crosslinked.

As the α-olefin in the copolymer rubber of propylene and α-olefin having 4 or more carbon atoms(propylene-α-olefin copolymer rubber), for example, α-olefins having 4 to 10 carbon atoms such as 1-butene, 1-hexene, 1-octene, 3-methyl-1-butene and the like, are listed. These α-olefins are used alone or in combination of two or more. The propylene-α-olefin having 4 or more carbon atoms copolymer rubber may contain other monomer units, which are the same as the monomer units for the ethylene-α-olefin copolymer rubber.

The content of a propylene unit derived from propylene in the propylene-α-olefin copolymer rubber is usually from 5 to 95% by weight, preferably from 15 to 85% by weight. The α-olefin content is usually from 5 to 95% by weight, preferably from 15 to 85% by weight (the total content of the propylene unit and the α-olefin unit is 100% by weight).

The propylene-α-olefin copolymer rubber preferably has an intrinsic viscosity [η] measured in xylene at 70° C. of 0.3 dl/g or more since sticky feeling does not occur in the resulted molded article.

Examples of the propylene-α-olefin copolymer rubber having 4 or more carbon atoms include, for example, a propylene-1-butene copolymer rubber, propylene-1-hexene copolymer rubber, propylene-1-octene copolymer rubber, and the like. The propylene-α-olefin copolymer rubber having 4 or more carbon atoms may also be crosslinked.

The conjugated diene-based polymer rubber is a polymer rubber composed of at least one conjugated diene, and as the conjugated diene, conjugated dienes having 4 to 8 carbon atoms such as 1,3-butadiene, 2-methyl-1,3-butadiene (isoprene), 1,3-pentadiene, 2,3-dimethylbutadiene and the like, are listed. The conjugated diene units may be contained singly or in combination of two or more. The conjugated diene-based polymer may contain other monomer units. As the other monomer, for example, ethylenically unsaturated carboxylic acid ester compounds such as methyl acrylate, methyl methacrylate, and the like, are listed.

As the conjugated diene-based polymer rubber, for example, polybutadiene, polyisoprene, styrene-butadiene random copolymer rubber (generally referred to as SBR) and the like are listed.

As the hydrogenated product of a conjugated diene-based polymer rubber, for example, a hydrogenated polybutadiene, hydrogenated polyisoprene, a hydrogenated styrene-butadiene random copolymer rubber (generally referred to as HSBR) and the like are listed.

In the hydrogenated product of the conjugated diene-based polymer, a hydrogenated conjugated diene unit is present, and in this unit, a unit having a side chain having 2 or more carbon atoms is also present. It is preferable that 60% or more of the hydrogenated conjugated diene units have a side chain having 2 or more carbon atoms, since a molded article of the thermoplastic elastomer obtained is excellent in flexibility and whitening resistance on bending.

In the hydrogenated product, 80% or more of conjugated diene units are preferably hydrogenated, 90% or more of conjugated diene units are further preferably hydrogenated. When the hydrogenation degree is less than 80%, the resulting molded article of the thermoplastic elastomer may be inferior in heat resistance (anti-yellowing property).

The polyolefin-based resin (ii) is a homopolymer or copolymer obtained by polymerizing at least one olefin in the presence of a stereospecific olefin polymerization catalyst such as a Ziegler-Natta catalyst, metal locene catalyst, or the like. Examples of the olefin include, for example, olefins having 2 to 8 carbon atoms such as ethylene, propylene, 1-butene, 1-hexene, 1-octene and the like. As the polyolefin-based resin (ii), for example, polyethylene-based resin (e.g. high density polyethylene, low density polyethylene), polypropylene-based resin, poly(1-butene) resin and the like, are listed. The polyolefin-based resins are used alone or in combination of two or more.

Among polyolefin-based resins, the polypropylene-based resin is preferable from the standpoints of heat resistance and cost of the thermoplastic elastomer composition. Further, as the polypropylene-based resin, an isotactic polypropylene-based resin is preferable.

Examples of the polypropylene-based resin include propylene homopolymer, propylene-α-olefin having 4–8 carbon atoms random copolymer (e.g. propylene-ethylene random copolymer, propylene-1-butene random copolymer), propylene-ethylene block copolymer and the like. Herein, propylene-ethylene block copolymer is a polymer obtained by homopolymerizing propylene in the presence of a stereo specific olefin polymerization catalyst in the first step and subsequently copolymerizing propylene with ethylene in the second step. As the polyolefin-based resins, those commercially available can be used.

The polyolefin-based resin (ii) has a melt flow rate (MFR) measured at a temperature of 230° C. under a load of 2.16 kgf according to JIS K-7210 of usually from 0.1 to 500 g/10 min., preferably from 0.5 to 300 g/10 min, from the standpoint of the strength of the resulting molded article. When the MFR is less than 0.1 g/10 min., the thermoplastic elastomer powder of the present invention is inferior in moldability, and when the MFR is over 500 g/10 min., the resulting molded article may be inferior in strength.

In the polyolefin-based thermoplastic elastomer, the amount of the polyolefin-based resin (ii) used is usually up to 1000 parts by weight, preferably from 10 to 500 parts by weight, per 100 parts by weight of the rubber (i). When the amount of the polyolefin-based resin (ii)is over 1000 parts by weight, there is a problem that the flexibility of the resulting molded article decreases, leading to poor touch feeling of the resulted molded article.

The thermoplastic elastomer is obtained by melt-kneading the rubber (i) and the polyolefin-based resin (ii) (blend type).

Further, when the olefin-based copolymer rubber is used as rubber (i), the thermoplastic elastomer includes a crosslinked type thermoplastic elastomer. The crosslinked type thermoplastic elastomer can be obtained by either melt-kneading the olefin-based copolymer rubber and the polyolefin-based resin (ii) in the presence of an organic peroxide as a crosslinking agent and optionally a crosslinking aid or by melt-kneading a olefin-based copolymer rubber previously crosslinked and the polyolefin-based resin (ii).

Moreover, there can also be used polymer particles which are usually called reactor-TPO (R-TPO), made of polyolefin-based thermoplastic elastomer. The polymer particles, and a method for producing those is described in, for example, JP04021408A.

The styrene-based thermoplastic elastomer includes, for example, block copolymer rubbers of a vinyl aromatic compound and a conjugated diene, and hydrogenated products thereof.

As the vinyl aromatic compound, for example, vinyl aromatic compounds having 8 to 12 carbon atoms such as styrene, p-methylstyrene, α-methylstyrene and the like are listed. Styrene is most preferred. As the conjugated diene, the same conjugated dienes having 4 to 8 carbon atoms for the conjugated diene-based polymer rubber as listed above. The conjugated dienes may be used alone or in combination of two or more.

Examples of the block copolymer of a vinyl aromatic compound and a conjugated diene include, for example, styrene-butadiene block copolymer rubber, styrene-isoprene block copolymer rubber, styrene-butadiene-isoprene block copolymer rubber and the like, and these can be produced by known methods. The block copolymer of a vinyl aromatic compound and a conjugated diene may be constituted of two or more blocks having different constitutions.

As the block copolymer of a vinyl aromatic compound and a conjugated diene, for example, styrene-butadiene block copolymer rubbers having a structure composed of styrene homopolymer block-butadiene homopolymer block-styrene homopolymer block (generally referred to as SBS), and the like, are listed. Further, copolymer rubber having a structure composed of styrene homopolymer block-styrene·butadiene copolymer block-styrene homopolymer block is also listed. The ·butadiene copolymer rubber may be a block having a structure in which styrene and butadiene are randomly copolymerized, or a block having a tapered structure in which the content of a styrene unit increases gradually to a direction in a styrene-butadiene copolymer block (chain).

Examples of the hydrogenated product of the copolymer rubber of a vinyl aromatic compound and a conjugated diene include hydrogenated products of the block copolymers described above.

In such hydrogenated product, 80% or more of conjugated diene units are preferably hydrogenated, 90% or more of conjugated diene units are further preferably hydrogenated, when not cross-linked. When the hydrogenation degree is less than 80%, the resulting molded article may be inferior in heat resistance (anti-yellowing property). Further, it is preferable that 60% or more of hydrogenated conjugated diene units are conjugated diene units having a side chain having 2 or more carbon atoms.

The hydrogenated product of the vinyl aromatic compound-a conjugated diene copolymer rubber can be produced, for example, by methods described in JP-02-36244A, JP03-72152A, JP03-725123A, JP07-118335A, JP56-38338A, JP61-60739A and the like.

The content of the vinyl aromatic compound units in the vinyl aromatic compound-conjugated diene copolymer rubber or the hydrogenated product thereof, is preferably 50% by weight or less, more preferably 20% by weight or less, from the standpoint that a molded article excellent in flexibility is obtained. When the content is over 50% by weight, the strength of a molded article obtained tends to become insufficient.

Further, the styrene-based elastomer may contain the polyolefin-based resin (ii), preferably the polypropylene-based resin described above. By inclusion of a polyolefin-based resin, the strength of the thermoplastic elastomer composition can be adjusted to a desired value. The melt viscosity thereof can be adjusted to control moldability, and heat resistance can be imparted to the resulted molded article. The amount of the polyolefin-based resin (ii) used is preferably up to 1000 parts by weight, more preferably from 10 to 500 parts by weight per 100 parts by weight of the styrene-based elastomer.

The thermoplastic elastomer used in the present invention has a melt flow rate (MFR) measured at a temperature of 230° C. under a load of 2.16 kgf according to JIS K-7210 of usually from 0.1 to 200 g/10 min., preferably from 1to 100 g/10 min. When the MFR is less than 0.1 g/10 min., the thermoplastic elastomer powder used in the present invention is inferior in melt moldability, and when the MFR is over 200 g/10 min., the resulting molded article may be inferior in strength.

Further, as polyurethane-based thermoplastic elastomer and polyvinyl chloride-based thermoplastic elastomer, those which are known can be also used.

The thermoplastic elastomer may also contain various additives such as mineral oil-based softeners; heat-resistant stabilizers such as a phenol-based, sulfite-based, phenylalkane-based, phosphite-based, amine-based, amide-based stabilizers, and the like; weathering agents, antistatic agents, pigments, metal soaps, waxes, anti-fungus agents, anti-bacterial agents, fillers and the like.

When the thermoplastic elastomer composition contains a mineral oil softener, a thermoplastic elastomer powder excellent in melting property and a molded article excellent in flexibility can be obtained.

When the thermoplastic elastomer composition contains a pigment, a molded article can be obtained which is not easily discolored even if it is wiped with an organic solvent such as hexane, benzine, toluene and the like. Examples of the pigment include organic pigments such as azo pigments, phthalocyanine pigments, threne pigments, dying lake and the like, and inorganic pigments such as oxide pigments like titanium oxide and the like, chromate molybdate pigments, selenium sulfate compounds, ferrocyane compounds, carbon black, and the like.

As the pigment, any of liquid and powdery materials may be used. When a powdery material is used, it is preferable that the primary particle size thereof is 300 nm or less from the standpoint of uniformity of coloration. Further, when a powdery pigment is used, it can also be supported on a carrier such as calcium carbonate, a metal soap, magnesium oxide or the like. In this case, the carrier has a primary particle size usually of 10 μm or less, preferably from 1 to 5 μm. In this case, the ratio by weight of a powdery pigment to a carrier is usually from 20:80 to 80:20, preferably from 25:75 to 75:25.

The thermoplastic elastomer composition can be obtained by melt-kneading necessary components using a single-screw extruder, twin-screw extruder, kneader, roll, Banbury mixer and the like. In this case, all of components to be kneaded can be melt-kneaded in one time, or several components can be kneaded before melt-kneading of un-selected components, to produce the composition.

Further, the composition can also be produced by dynamically kneading all of components to be kneaded, or several components selectively followed by melt-kneading the remainder components. Regarding the method of dynamic crosslinking and the addition amounts and kinds of a crosslinking agent and cross-linking aid used in the dynamic crosslinking, known methods described, for example, in JP05-5050A may advantageously be used. By dynamic crosslinking, the heat resistance of a molded article obtained by using the thermoplastic elastomer powder is improved.

The thermoplastic elastomer powder is produced by extruding a melted thermoplastic elastomer into water through a die having a plurality of orifices, then, cutting the extruded matter by a cutter rotating at high speed along the surface of the die to obtain thermoplastic elastomer powder. In this production, an extruder, a gear pump or the like is usually used. Use of a gear pump is effective for increasing the pressure of the thermoplastic elastomer in upstream side of the die.

In the production of the thermoplastic elastomer powder, it is necessary to introduce a material necessary into an inlet of an extruder, a gear pump or the like. The material may be the thermoplastic elastomer obtained by the above-mentioned method, or a compound obtained by mixing components necessary for obtaining the thermoplastic elastomer powder using a tumbler mixer or the like. In the latter case, necessary components may be divided and introduced into a plurality of inlet ports. The latter case is reasonable since the intended thermoplastic elastomer powder can be obtained directly after kneading of components without previously producing a thermoplastic elastomer.

In the production of the thermoplastic elastomer powder, the temperature of a thermoplastic elastomer directly before a die (in other words, at the inlet of the thermoplastic elastomer of the die) is controlled in the range from 120 to 220° C., preferably from 160 to 200° C. When the temperature is lower than 120° C., the pressure of a thermoplastic elastomer before the die increases remarkably, consequently, the production of powder becomes impossible or remarkably low in productivity. When the temperature is higher than 220° C., powder particles are fused, consequently, the production of powder becomes impossible or remarkably low in productivity. Herein, the temperature of the thermoplastic elastomer directly before being introduced into the die means a temperature measured by a thermometer equipped on a die adapter.

Further, it is necessary to control the temperature of a die in the range from 230 to 350° C., preferably from 250 to 310° C. When the temperature is lower than 230° C., productivity decreases due to occurrence of clogging. On the other hand, when the temperature is higher than 350° C., powder particles fuse, consequently, production of a powder becomes impossible. The temperature of a die in the present invention means a temperature of the surface of the die measured when the die is heated under the same condition as in production of the thermoplastic elastomer powder, and water flowing for the purpose of cooling and transportation of the powder are removed from the surface of the die.

In the production of the thermoplastic elastomer powder, the diameter of an orifice in a die is preferably 0.7 mm or less, more preferably 0.5 mm or less, further preferably 0.4 mm or less. On the other hand, the lower limit of the diameter is particularly limited, but usually 0.1 mm or more. When the orifice diameter is more than 0.7 mm, clogging increases, consequently, productivity may decrease. The orifice diameter referred to in the present invention means a diameter of most slim part of the orifice. Modification, such as taper formation, on an orifice and the like may also be conducted for the purpose of promoting flow of a thermoplastic elastomer composition in melt state. Particularly, the diameter of an orifice is preferably 0.36 mm or less, more preferably 0.33 mm or less, most preferably 0.30 mm or less for efficiently obtaining a thermoplastic elastomer powder having a sphere-reduced average diameter of less than 500 μm.

In the production of the thermoplastic elastomer powder, the average discharging amount per orifice of a die is preferably from 1 to 1300 g/hour, more preferably from 10 to 600 g/hour, most preferably from 10 to 500 g/hour. When the discharging amount is less than 1 g/hour, the extrusion becomes unstable, consequently, stable production may be impossible. When the discharging amount is more than 1300 g/hour, it may be necessary to extremely increase cutting times in some cases. Particularly, the average discharging amount per orifice of a die is preferably from 1 to 450 g/hour, more preferably from 10 to 250 g/hour, most preferably from 10 to 200 g/hour for efficiently obtaining a thermoplastic elastomer powder having a sphere-reduced average diameter of less than 500 μm.

The cutting speed is desirably from 10,000 to 150,000 times/min. When the cutting speed is less than 10,000 times/min., the productivity decreases, and when the cutting speed is over 150,000 times/min., the production of the powder becomes difficult due to fusion of the resin.

The temperature of water for transporting and cooling a powder is usually controlled in the range from 5 to 95° C. When the water temperature is higher, a thermoplastic elastomer may be fused easily, while when the water temperature is low, clogging may occur easily. In this range, temperatures from 30 to 90° C. are preferable. When the temperature is over 95° C., water may be evaporated, and when the temperature is less than 5° C., a freezer may be required for controlling the water temperature. Further, a surfactant or the like may also be added to water for the purpose of preventing fusion of the thermoplastic elastomer particles obtained by cutting in the water. The surfactant includes cationic surfactants, anionic surfactants, ampholytic surfactants, nonionic surfactants and the like.

The thermoplastic elastomer powder obtained by the production method of the present invention can be applied as materials in various powder moldings such as a powder slush molding, fluidized bed coating, electrostatic coating, powder thermal spraying, rotation molding press molding, extrusion molding, injection molding and the like.

The present invention is illustrated using Examples and Comparative Examples in more detail, but is not limited thereto.

Evaluation of Powder Production

[1] Production Condition

The following conditions were used as common conditions in conducting experiments of the following Examples and Comparative Examples.

Die upstream side: TEX30XCT-21W manufactured by The Japan Steel Works, Ltd. and Gear pump EXTRE28/28 manufactured by MAAG Ltd.

Die: Type A (orifice diameter 0.31 mmø, orifice number 100)
Type B (orifice diameter 0.34 mmø, orifice number 100)
Type C (orifice diameter 0.29 mmø, orifice number 98)
Type D (orifice diameter 0.37 mmø, orifice number 108)
The flow rate of die heat oil was controlled to 4.8 m³/hour.

Die downstream side: The temperature of water for cooling and transporting a thermoplastic elastomer composition is controlled at 60° C., and the flow rate is controlled at 20 m³/hour.

Material: Thermoplastic elastomer ($\eta^*(1)=8\times10^2$ poise) obtained by kneading previously by a twin-screw extruder (manufactured by Toshiba Machine Co., Ltd., TEM50B)

Composition: Hydrogenated diene-based copolymer (manufactured by JSR Co., Ltd., hydrogenated product of styrene-butadiene block copolymer, styrene unit content: 16 wt %, MFR=10) 45 parts by weight Ethylene-propylene copolymer rubber (manufactured by Sumitomo Chemical Co., Ltd., propylene unit content: 27 wt %, MFR=1 g/10 min.) 5 parts by weight Propylene-ethylene random copolymer resin (manufactured by Sumitomo Chemical Co., Ltd., ethylene unit content: 5%, MFR=220 g/10 min.) 40 parts by weight WAX Hi-Mic 1080 (Nippon Seiro K.K.) 10 parts by weight Lubricant: MOLD WIZ#INT-33PA (manufactured by AXEL PLASTICS RESEARCH LABORATORIES INC.) 0.2 parts by weight Antioxidant: Irganox-1076 (manufactured by Chiba Specialty Chemical) 0.6 parts by weight

[2] Evaluation Method (1) Sphere-reduced Average Particle Diameter

The sphere-reduced average particle diameter (R) (μm) was calculated according to the following formula (2):

$$R=\{6\times W/(\pi\times D\times N)\times 10^{15}\}^{1/3} \quad (2)$$

W: Weight measured by randomly collecting about 50 mg of thermoplastic elastomer powder and weighing it (g)

N: Number of particles of thermoplastic elastomer powder corresponding to the above W D: density of thermoplastic elastomer (Kg/m³)

(2) Clogging Ratio

The clogging ratio was calculated according to the above-described equations (1) and (2)

EXAMPLES 1 TO 5 AND COMPARATIVE EXAMPLES 1 TO 2

Thermoplastic elastomer powders were produced under the conditions described above and shown in Tables 1 and 2.

Also as apparent from the evaluation results in Table 1, when the production method provided by the present invention is used, a thermoplastic elastomer powder having a sphere-reduced average particle diameter of 700 μm or less can be produced without decreasing productivity.

TABLE 1

| Condition | Example 1 | Example 2 | Example 3 | Example 4 |
|---|---|---|---|---|
| (a) Temperature of thermoplastic elastomer composition (° C.) | 183 | 163 | 167 | 187 |
| (b) Die temperature (° C.) | 284 | 284 | 284 | 284 |
| Die orifice diameter (mm) | 0.31 | 0.34 | 0.29 | 0.37 |
| (Die type) | (A) | (B) | (C) | (D) |
| Average discharge amount per orifice of die (g/hour) | 100 | 250 | 153 | 139 |
| Cutting speed (times/min.) | 42,720 | 50,204 | 50,400 | 21,420 |
| Evaluation Sphere-reduced average particle diameter of thermoplastic elastomer powder (μm) | 456 | 599 | 489 | 690 |
| Clogging ratio (%) | 11.7 | 17.1 | 7.1 | 28.9 |

TABLE 2

| Condition | Comparative Example 1 | Comparative Example 2 | Example 5 |
|---|---|---|---|
| (a) Temperature of thermoplastic elastomer composition (° C.) | 247 | 180 | 165 |
| (b) Die temperature (° C.) | 284 | 190 | 284 |
| Die orifice diameter (mm) | 0.29 | 0.29 | 0.34 |
| (Die type) | (C) | (C) | (B) |
| Average discharge amount per orifice of die (g/hour) | 102 | 102 | 100 |
| Cutting speed (times/min.) | 36,000 | 36,000 | 50,176 |
| Evaluation Sphere-reduced average particle diameter of thermoplastic elastomer powder (μm) | *1 | *2 | 446 |
| Clogging ratio (%) | | | 19.6 |

*1 Production is impossible due to resin fusion
*2 Production is impossible due to increase in resin pressure because of clogging of die orifices As described above, according to the present invention, there can be provided a production method which can efficiently produce a thermoplastic elastomer powder having a sphere-reduced average particle diameter of 700 μm or less.

What is claimed is:

1. A method for producing powder of a thermoplastic elastomer having a sphere-reduced average particle diameter of 700 μm or less by an under water cut method which comprises, discharging the thermoplastic elastomer in melt state through a plurality of orifice of a die into water, and cutting the discharged matter with a cutter blade rotating along the die surface to obtain powder of the thermoplastic elastomer, wherein the method satisfies the following conditions (a) and (b):

(a) the temperature of the thermoplastic elastomer directly before the die is from 120 to 220° C., and (b) the temperature of the die is from 230 to 350° C.

2. The method according to claim 1, wherein the diameter of the orifice is 0.7 mm or less.

3. The method according to claim 1, wherein the diameter of the orifice is 0.36 mm or less.

4. The method according to claim 1, wherein the temperature of the thermoplastic elastomer directly before the die is from 160 to 220° C.

5. The method according to claim 1, wherein the temperature of a die is from 250 to 310° C.

6. The method according to claim 1, wherein the thermoplastic elastomer is a thermoplastic elastomer containing a polyolefin-based resin.

7. The method according to claim 1, wherein the polyolefin-based resin is a polypropylene-based resin.

* * * * *